United States Patent

Stange

[15] 3,686,679

[45] Aug. 22, 1972

[54] MULTI-STYLUS RECORDING ASSEMBLY

[72] Inventor: Klaus K. Stange, Pittsford, N.Y.

[73] Assignee: Xerox Corporation, Rochester, N.Y.

[22] Filed: Oct. 29, 1970

[21] Appl. No.: 85,230

Related U.S. Application Data

[63] Continuation of Ser. No. 829,637, June 2, 1969.

[52] U.S. Cl. ............................346/139 A, 346/139 C

[51] Int. Cl. ............................................G01d 15/06

[58] Field of Search .........346/139 R, 139 A, 139 C, 74 CH, 346/74 E, 64 ES, 74 S, 74 SB, 74 SC

[56] References Cited

UNITED STATES PATENTS

| | | | |
|---|---|---|---|
| 2,665,965 | 1/1954 | Blackman | 346/139 |
| 3,166,752 | 1/1965 | Waterman | 346/74 |
| 3,363,261 | 1/1968 | Maiershofer | 346/74 |

*Primary Examiner*—Joseph W. Hartary
*Attorney*—Ronald Zibelli, Paul M. Enlow, James J. Ralabate, Norman E. Schrader and John E. Beck

[57] ABSTRACT

An alphanumeric recording assembly wherein a styli support body fixed to an endless drive belt is stabilized by counter forces exerted by spring brushes sliding against commutator bars facing parallel to the belt and a support plate behind the belt in the recording zone.

11 Claims, 3 Drawing Figures

Patented Aug. 22, 1972 3,686,679

2 Sheets-Sheet 1

INVENTOR.
KLAUS K. STANGE

BY John E. Beck

ATTORNEY

Patented Aug. 22, 1972 3,686,679

2 Sheets-Sheet 2

MULTI-STYLUS RECORDING ASSEMBLY

This is a streamlined continuation of application, Ser. No. 829,637 filed June 2, 1969.

This invention relates generally to stylus recorders, and more specifically to stylus assemblies and the structure associated therewith.

Stylus recording has always existed in one form or another for a very long time. Single stylus recorders have been used in facsimile recording systems. Multiple styli have been employed for recording alphanumeric information since this technique is capable of high recording speeds and acceptable quality. The recording technique itself has taken various forms from impact to electrography or from mechanical to electrical. The last form includes electrographic, electrolytic, and electrosensitive. In these systems, certain limitations exist on the stylus assembly and its relationship with the recording medium. Generally, these limitations are few in number but significant in distracting from the quality of the recording and the commercial success of the recorder.

Constant contact within a predetermined range of pressure is preferred between each stylus and the recording medium. The stylus can tear the medium if its pressure is excessive and skip on the medium if the pressure is too slight. Of course, pressure causes wear of the contact surface of the stylus which means shorter life for the stylus as well as a dynamic adjustment to maintain contact as the stylus wears. These disadvantageous aspects of prior art systems result in higher costs and somewhat inconsistent quality in the recorded output.

The present invention has none of these undesirable features yet insures a high quality and low cost recorder.

Therefore, it is an object of the present invention to improve multi-stylus recording.

It is another object of the present invention to provide an improved multi-stylus assembly and commutator arrangement therefor.

A further object of the present invention is to provide an improved multi-stylus assembly having high longevity.

These and other objects which may become apparent may better be appreciated when the following detailed description of the present invention is read in connection with the appended drawings wherein.

Figure 1:
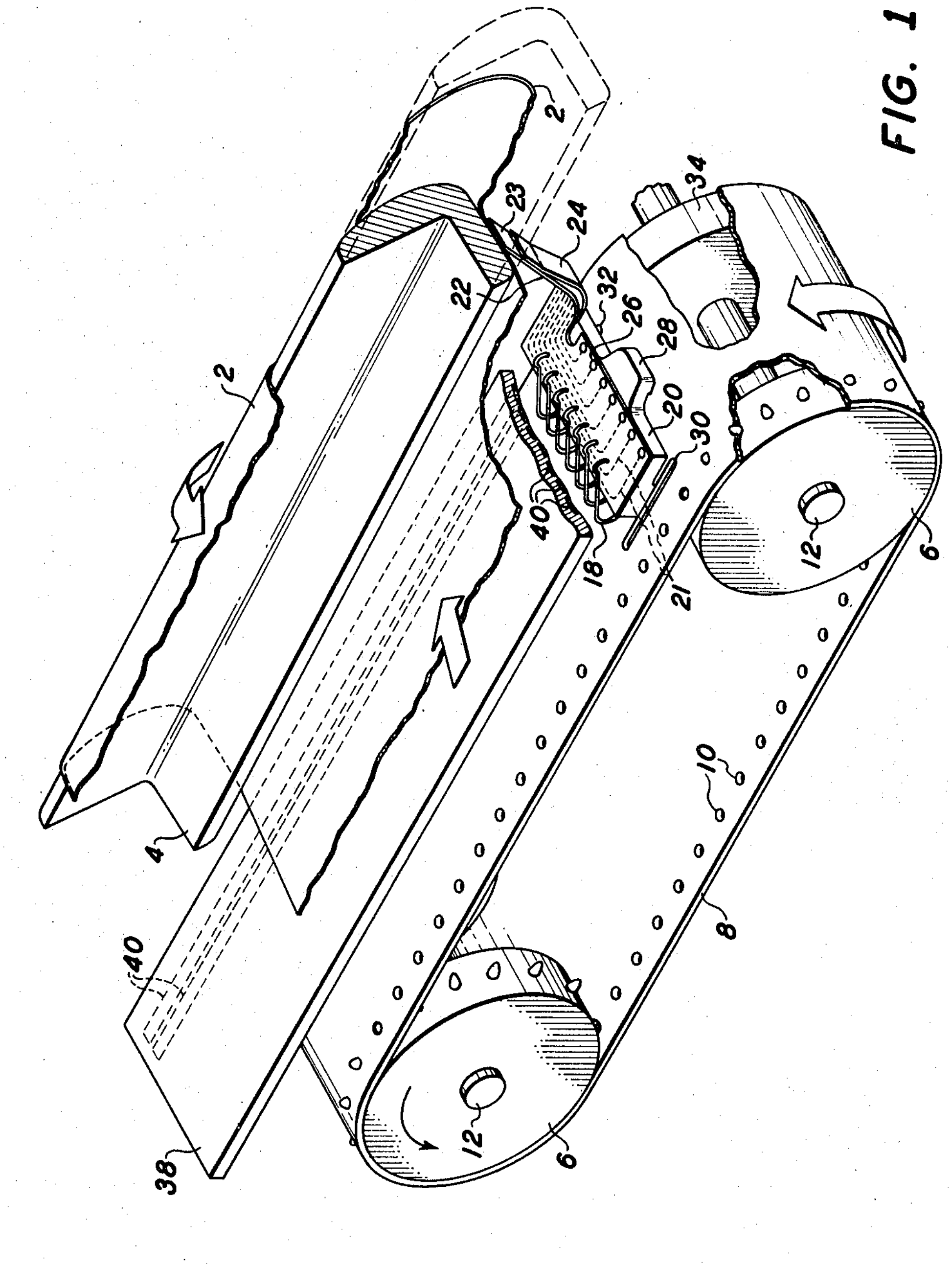
FIG. 1 is a perspective view of a recording station employing the stylus assembly and commutator arrangement of the present invention with some parts broken away for purposes of clarity.

Reference will now be made to all three figures which show in different views and perspectives the present invention which has utility in multiple stylus recorders wherein electrical signals provided to the styli either create visible marks on a recording medium or provide electrostatic charges on this medium which may subsequently be rendered visible. Such types of recorders are well known in the art for recording alphanumeric information wherein each alphanumeric symbol is generated within the confines of the matrix, for example, 5 × 7.

Typically in such recorders a recording medium 2 is fed through a recording station between a moving linear array of styli and a backing support or electrode 4. Generally, the recording medium may be fed mechanically from a roll in a direction substantially perpendicular to the direction of movement of the linear array of styli and substantially parallel to the locus of contact points of the styli and the recording medium. In the present invention this motion is imparted to the styli primarily by a force coupled to either one or both sprocket wheels 6 about which is entrained an endless belt 8 having sprocket holes 10 which cooperate with the sprockets on wheels 6. The wheels 6 may be driven from a suitable source of motive power by way of conventional mechanical coupling to shaft 12.

Figure 2:
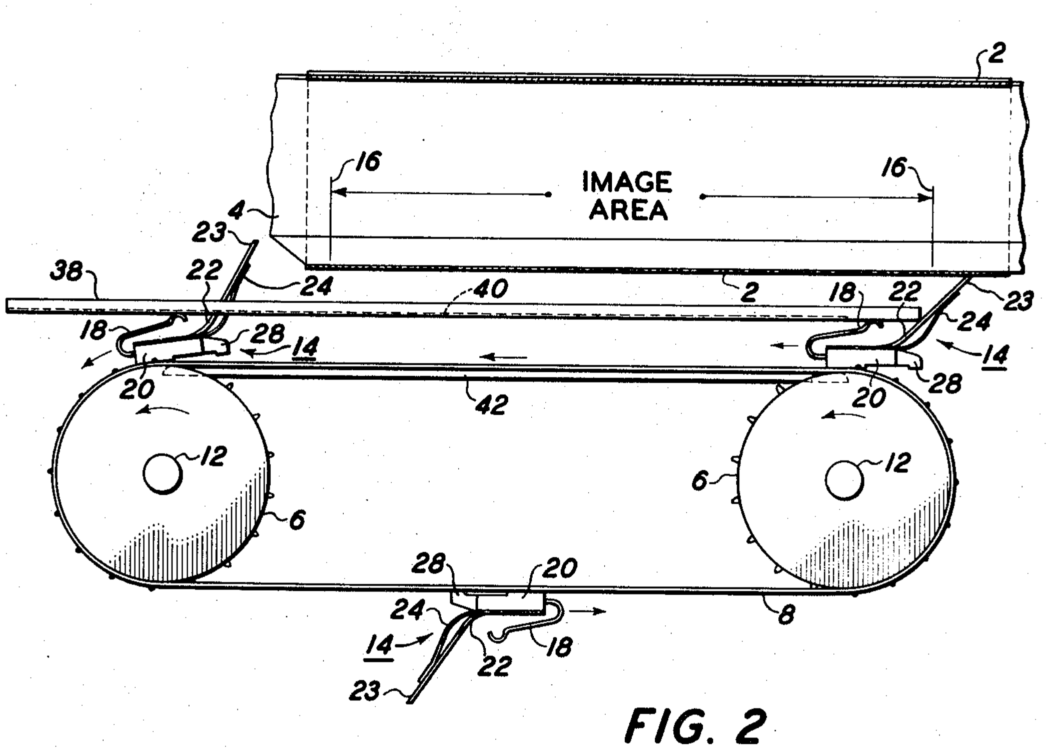
FIG. 2 depicts a front view of the present invention.

Attached to the belt 8 are a plurality of recording heads given the general reference numeral 14. These heads may be attached to the outer surface of the belt 8 in any suitable manner, such as glueing or riveting. As shown best in FIG. 2, three such heads 14 are attached to the belt, each being equidistantly spaced from adjacent heads. FIG. 2 also shows that the relative spacing between any two successive heads 14 is a distance substantially equal to the width of the recording zone dictated by lines 16. In this manner, if the recording medium 2 is moved in a continuous manner and the belt 8 is likewise driven continuously, as one array of styli moves out of the recording zone the next successive stylus array enters the recording zone. This makes possible high speed continuous recording without having to stop the movement of the recording medium or the styli. This of course, assumes that the direction of movement of the styli array is skewed rather than perpendicular with respect to the direction of movement of the recording medium thereby compensating for the continuous movement of the recording medium while still recording substantially horizontal parallel lines of alphanumeric information.

Each recording head 14 is comprised of a plurality of resilient or spring brushes 18, body member 20, and a stylus array 22. As shown best in FIG. 1 the stylus array 22 may take the form of a flexible printed circuit board having etched or printed thereon individual conductors 21 in number equal to the desired number of styli. These conductors 21 are brought together in a close parallel relationship at the recording tip 23 of board 22. At this tip, the end of each conductor or stylus is exposed for contact with the recording medium. At all points on the array the styli are electrically insulated from each other.

FIG. 1 shows an optional spring member in the form of a flat resilient metal piece 24 which is secured to the body 20 and is so positioned relative to a portion of the circuit board as to mechanically bias the terminal portion of the stylus array or the recording portion thereof against the recording medium in the recording zone.

The other end of the conductors 21 on the circuit board 22 terminate in a like plurality of terminals 26 which may be spot soldered to ends of the spring brushes 18 which pass through one end of the body member 20 and protrude through the upper surface of the body perpendicular to the surface of entry of the spring brushes. It should be understood, however, that the spring brushes themselves need not be of a dimension such that they protrude through the body 20 to terminal points 26 and may only protrude into body 20 a short distance to be then electrically connected to terminals 26 in any conventional manner. Similarly, conductors 23 need not be etched or printed and may be pieces of small diameter discrete conductive wires adhered to a support or even extend toward the medium unsupported.

Figure 3:
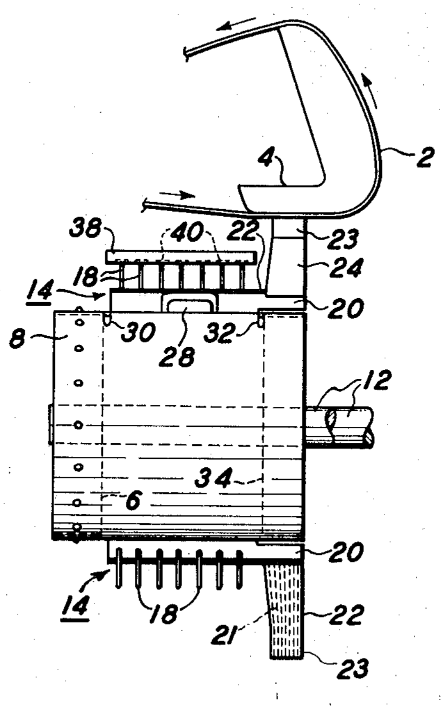
FIG. 3 illustrates the present invention as seen from the right side of FIG. 2.

Body 20 includes an extension or protrusion designated by reference numeral 28 which, as will be seen in more detail hereinafter, contributes to the overall dynamic stability of the stylus assembly during recording. The role of this protrusion which is no more than an extension of body 20 can best be appreciated with reference to FIGS. 2 and 3 specifically. As noted hereinabove, the body 20 is secured to belt 8 by any one of several conventional methods. For illustrative purposes it may be considered that body 20 is glued to the outer surface of belt 8. In this situation the body is adhered to the belt's surface over an area of the body one dimension of which is shown in FIG. 2 when the right-most assembly 14 is viewed. Protrusion 28 and a portion of the body 20 are seen being free of the belt while a portion of body 20 is shown resting on the belt. The contact area of this latter portion is actually adhered to the belt. From another angle, FIG. 3 illustrates the other dimension of the area fixed to the belt which is seen to be defined by two slots 30 and 32 in the belt 8. Therefore, the portion of body 20 which is actually adhered to the belt is defined in the direction of travel of the recording head 14 by the dimension equal to the contacting portion of the head 14 previously alluded to in FIG. 2 and the dimension in the direction perpendicular to the travel of the belt illustrated in FIG. 3 as defined by the distance between the inside edges of slots 30 and 32.

As shown in FIGS. 1 and 3, the sprocket wheels 6 do not have an axial dimension equal to the width of belt 8 but are wide enough only to support sprockets on their outer peripheries. Sharing shaft 12 with each of the sprocket wheels 6 is a second wheel 34 which may or may not be sprocketed having an interior surface which is spaced from the interior surface of its respective sprocket wheel by an amount greater than the distance between slots 30 and 32. In this manner, as the belt rotates in the direction indicated by the arrows, the portion of the belt supporting body 20 is permitted to divert from the curved path of the belt at that point therein equal to the diameter of sprocket wheels 6 and the auxiliary support wheels 34 and dip between wheels 6 and 34. In this manner, the joint between the belt 8 and body 20 is not stressed as the belt moves head 14 around the wheels 6 and 34. This also permits the use of smaller diameter sprocket wheels.

In order to provide electrical recording signals to the moving recording head 14 via the spring brushes 18 there is provided a commutator assembly 38 which may be comprised of any suitable dielectric material having one surface in which is embedded a plurality of equally spaced commutator bars shown in broken lines in FIG. 1 and designated by the reference numeral 40. The commutator bars are equal in number to the number of spring brushes 18 which, in turn, are in equal number to the styli used in the particular recording apparatus. Electrical conductors may be readily connected to bars 40 to provide the energization thereof. As shown in FIG. 3, the commutator assembly 38 extends parallel to the plane defined by shafts 12 to a point adjacent the recording end 23 of stylus card 22 such that actual recording contact is made on the remote side of the commutator assembly 38 from the commutator-spring brush contact points. Also appreciated from FIG. 3 is the fact that body 20 extends out of contact from the belt 8 and over slot 32 to provide support for the terminal portion of the stylus card 22.

Before a description of the inter-relationship of the various components of the present invention is given, it is helpful to understanding the present invention to refer to the support plate 42 which extends parallel to the recording zone and substantially coextensive therewith between the pairs of wheels 6 and 34. It may be suitably supported by the frame of the recorder in which the present invention is incorporated and is proximate to the belt 8 to such a degree that the belt is in frictional sliding contact with the support plate in the recording zone.

Dynamically, the present invention separates the force required by the stylus tips against the recording medium for consistent quality recording from the force necessary to insure adequate electrical contact between the spring brushes 18 and the commutator bars 40. In this manner, compromise between the two force requirements is obviated and the optimum force requirements are achieved and held. This is accomplished by utilizing the spring biasing effect of the brushes 18 acting in contact with the commutator bars 40 against the body 20 and its extension 28 to force these members against the belt to which they are in contact. To counterbalance this force the support plate 42 is provided. This results in effectively providing an inflexible drive belt 8 in the recording zone itself. The force of the styli against the recording medium 2 is provided solely by the amount of spring tension designed into the circuit board or stylus card 22. As noted hereinabove, this can be augmented by the use of a supplemental spring member 24 (FIG. 1).

In summary therefore, dynamically body 20 of the stylus assembly 14 is rigidly fixed by the force of the independently mounted spring brushes 18 and the restraining effect of support plate 42 against the interior surface of the belt 8. This permits minimum, if any, movement of the body 20, and consequently the stylus array 22, in a direction perpendicular to the belt in the recording zone. The sprocket wheels 6 cooperate with belt 8 to insure that the stylus assembly 14 adhered thereto rigidly does not move in a direction parallel to the width dimension of belt 8 in the recording zone. These structures and forces thereby cooperate to maintain the integrity of the position of the stylus assembly 14 during the recording process itself.

It is well to note, referring to FIG. 2, that the contact point of the spring brushes 18 and commutator bars 40 are on a line in a plane which is substantially perpendicular with the plane of the belt 8 in the recording zone which line passes substantially through the midpoint of the combined members 20 and 28. This midpoint is measured in a direction parallel to the direction of movement of the belt 8.

The present invention as described hereinabove provides for the maximum force necessary between the spring brushes 8 and their respective commutator bars 40 to permit proper electrical contact therebetween without increasing or affecting in any way the optimum force between the recording styli and the recording medium which permits adequate recording with a minimum of stylus wear. In addition, the orientation of the commutator assembly 38 further insures proper contact between the brushes 18 and the commutator bars 40 by isolating physically the contact points between these members from possible recording medium particles raised from the recording medium during the traversal of the styli thereacross.

While the invention has been described with reference to a preferred embodiment, it will be understood by those skilled in the art that various changes may be made and equivalents may be substituted for elements thereof without departing from the true spirit and scope of the invention.

I claim:

1. A recording assembly for a recorder capable of recording information in the form of a matrix on a suitable recording medium positioned at a recording zone on a backing member comprising:

a. a movable member having inner and outer surfaces;

b. a body of dielectric material fixed to said outer surface of said driven member;

c. a plurality of conductive styli mounted independently on said body and extending away from said outer surface to resiliently engage said recording medium in the form of a linear array of equidistantly spaced contact point;

d. a plurality of conductive spring members like in number to said styli mounted independently with said body and extending substantially away from said outer surface;

e. means for electrically coupling each of said styli to a respective one of said spring members;

f. a commutator assembly including a planar surface substantially parallel to said outer surface and supporting thereon a plurality of conductors adapted to be coupled to recording signals, each conductor associated with a respective one of said spring members, said commutator assembly spaced from said outer surface to resiliently engage said spring members with said conductors; and, g. a support plate supported independent of said movable member and proximate to said inner surface and in slidable contact therewith.

2. A recording assembly as defined in claim 1 wherein:

a. said movable member is an endless belt having two slots therein, one on either side of said body and parallel to the movement of said belt;

b. at least two roller means about which said belt is entrained, each of said roller means including two wheels mounted in spaced relationship on a common shaft, the spacing between said wheels on each shaft being greater than the distance separating said slots.

3. A recording assembly as defined in claim 1 wherein the contact point between said spring members and said conductors lies substantially on a line perpendicular to said outer surface and passing through the midpoint of said body as measured in a direction parallel to the direction of movement of said movable member.

4. A recording assembly for a recorder capable of recording information in matrix form on a suitable recording medium supported in a recording zone by an elongated backing member comprising:

a. an endless drive member having inner and outer surfaces;

b. roller means for supporting said drive member in a configuration such that the outer surface of a portion of said drive member is substantially parallel with said backing member;

c. a dielectric body mounted on said outer surface;

d. a plurality of conductive styli mounted on said body to resiliently engage said recording medium;

e. a support plate substantially parallel to said portion of said drive member and proximate said inner surface and inslidable contact therewith;

f. a support member having a planar surface substantially parallel to and facing the outer surface of said portion;

g. resilient means independently mounted on said body and resiliently engaging said planar surface of said support member for urging said body and that portion of said drive member associated therewith against said support plate.

5. A recording assembly as defined in claim 4 wherein said resilient means includes a plurality of spring brushes equidistantly spaced from each other and electrically connected to individual ones of said styli, and said support member includes a plurality of conductive commutator bars on said planar surface for electrical contact with said spring brushes.

6. A recording assembly for a recorder capable of recording information in the form of a matrix on a suitable recording medium positioned at a recording zone on a backing member comprising:

a. a flexible carrier movable through said recording zone, said carrier having first and second surfaces;

b. at least one conductive means for translating electrical signals, said at last one conductive means having a resilient brush portion and a stylus portion, adapted to engage the recording medium;

c. means attaching said at least one conductive means to one of said surfaces such that said brush portion extends generally away from said attaching means;

d. a support positioned adjacent said flexible carrier;

e. means including said resilient brush portion of said conductive means for biasing said attaching means toward said support and said flexible carrier into engagement with said support said biasing means and said support cooperating to restrain movement of said attaching means;

f. said at least one conductive means being positioned so that said stylus portion engages said recording medium.

7 An assembly according to claim 6 wherein, said support is positioned opposite one of said surfaces and said biasing means comprises commutator support means including at least one conductor, said commutator support means being opposite the other of said surfaces.

8. An assembly according to claim 7 wherein said resilient brush and stylus portions are independently supported by said attaching means.

9. An assembly according to claim 8 wherein, a. said flexible member is an endless belt having two slots therein, one on either side of said attaching means and parallel to the direction of movement of said belt; and b. said assembly further comprises at least two roller means about which said belt is entrained, each of said roller means including two wheels mounted in spaced relationship on a common shaft, the spacing between said wheels on each shaft being greater than the distance separating said slots.

10. An assembly according to claim 9 wherein, the contact point between said resilient brushes and said conductors lies substantially on a line perpendicular to said other of said surfaces and passing through the midpoint of said attaching means as measured in a direction parallel to the direction of movement of said flexible member.

11. An assembly according to claim 6 wherein said resilient brush and stylus portions are independently supported on said attaching means.

* * * * *